(12) United States Patent
Tan et al.

(10) Patent No.: US 11,944,975 B2
(45) Date of Patent: *Apr. 2, 2024

US011944975B2

(54) THERMAL CYCLER SYSTEMS AND METHODS OF USE

(71) Applicant: LIFE TECHNOLOGIES CORPORATION, Carlsbad, CA (US)

(72) Inventors: Zeqi Tan, Singapore (SG); Wuh Ken Loh, Singapore (SG); Siew Yin Lee, Singapore (SG); Kuan Moon (Bernard) Boo, Singapore (SG)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,139

(22) Filed: Dec. 29, 2022

(65) Prior Publication Data

US 2023/0134044 A1 May 4, 2023

Related U.S. Application Data

(60) Continuation of application No. 16/590,459, filed on Oct. 2, 2019, now Pat. No. 11,548,007, which is a (Continued)

(51) Int. Cl.
*B01L 7/00* (2006.01)
*B01L 9/00* (2006.01)

(52) U.S. Cl.
CPC ................. *B01L 7/52* (2013.01); *B01L 9/523* (2013.01); *B01L 2200/023* (2013.01); (Continued)

(58) Field of Classification Search
None
See application file for complete search history.

(56) References Cited

U.S. PATENT DOCUMENTS

| | | | |
|---|---|---|---|
| 6,340,589 | B1 | 1/2002 | Turner et al. |
| 6,719,949 | B1 | 4/2004 | Barzilai et al. |

(Continued)

FOREIGN PATENT DOCUMENTS

| | | | |
|---|---|---|---|
| CN | 103415346 | A | 11/2013 |
| CN | 103857464 | A | 6/2014 |

(Continued)

OTHER PUBLICATIONS

European Communication issued in Application No. 16 823 510.9, dated Jul. 23, 2019.

(Continued)

*Primary Examiner* — William H. Beisner
(74) *Attorney, Agent, or Firm* — JONES ROBB, PLLC

(57) ABSTRACT

A thermal cycler system comprises a sample block configured to receive a sample holder configured to receive a plurality of samples; an adaptor configured to surround a periphery of the sample block; and a drip pan configured to surround a periphery of the adaptor. The drip pan comprises one or more ejector mechanisms and one or more openings, the one or more ejector mechanisms configured to respectively extend through the one or more openings into contact with the sample holder in a state of the sample holder received by the sample block and the adaptor surrounding the periphery of the sample block.

16 Claims, 7 Drawing Sheets

Related U.S. Application Data division of application No. 15/387,614, filed on Dec. 21, 2016, now Pat. No. 10,471,432.

(60) Provisional application No. 62/372,876, filed on Aug. 10, 2016, provisional application No. 62/270,716, filed on Dec. 22, 2015.

(52) U.S. Cl.
CPC ..... *B01L 2200/025* (2013.01); *B01L 2200/04* (2013.01); *B01L 2300/0609* (2013.01); *B01L 2300/0829* (2013.01); *B01L 2300/0848* (2013.01); *B01L 2300/0858* (2013.01)

(56) References Cited

U.S. PATENT DOCUMENTS

| | | | | |
|---|---|---|---|---|
| 10,471,432 | B2 | 11/2019 | Tan et al. | |
| 11,548,007 | B2 | 1/2023 | Tan et al. | |
| 2002/0030044 | A1* | 3/2002 | Brown | B01L 7/52 219/521 |
| 2003/0044969 | A1 | 3/2003 | Shin et al. | |
| 2005/0084957 | A1 | 4/2005 | Atwood et al. | |
| 2007/0184548 | A1 | 8/2007 | Tan et al. | |
| 2007/0212775 | A1 | 9/2007 | Cohen et al. | |
| 2010/0028988 | A1 | 2/2010 | Chu et al. | |
| 2010/0124766 | A1* | 5/2010 | Ng | B01L 7/52 435/303.1 |
| 2012/0145587 | A1* | 6/2012 | Yeo | B01L 7/52 206/562 |
| 2015/0231636 | A1 | 8/2015 | Kiong et al. | |

FOREIGN PATENT DOCUMENTS

| | | | |
|---|---|---|---|
| CN | 204874536 | U | 12/2015 |
| DE | 10115848 | A1 | 10/2002 |
| DE | 102005044021 | | 3/2007 |
| DE | 102011109332 | | 2/2013 |
| WO | 01/56697 | A1 | 8/2001 |
| WO | 2012078930 | A2 | 6/2012 |
| WO | 2015/200788 | | 12/2015 |

OTHER PUBLICATIONS

Singapore Search Report and Written Opinion issued in Application No. 11201805240P, dated Aug. 14, 2019.

PCT/US2016/068151, Partial International Search Report dated Mar. 14, 2017, 3 pages.

PCT/US2016/068151, International Search Report and Written Opinion dated May 12, 2017, 9 pages.

Singapore Examination Report issued in corresponding Application No. 11201805240P, dated Dec. 22, 2020.

Chinese Office Action issued in corresponding Application No. 201680078409.2, dated Apr. 3, 2020.

* cited by examiner

THERMAL CYCLER SYSTEMS AND METHODS OF USE

CROSS REFERENCE TO RELATED APPLICATIONS

This application is a continuation application of U.S. application Ser. No. 16/590,459, filed Oct. 2, 2019, which is a divisional application of U.S. application Ser. No. 15/387,614, filed Dec. 21, 2016 (now U.S. Pat. No. 10,471,432), which claims the benefit under 35 U.S.C. § 119(e) of U.S. Provisional Patent Application Nos. 62/372,876 filed on Aug. 10, 2016 and to 62/270,716 filed on Dec. 22, 2015, each of which are incorporated herein by reference in their entirety.

TECHNICAL FIELD

The present invention relates generally to thermal cycler systems and methods of using same.

Introduction

Testing of biological or chemical samples often requires a device for repeatedly subjecting multiple samples though a series of temperature cycles. To prepare, observe, test, and/or analyze an array of biological samples, one example of an instrument that may be utilized is a thermal cycler or thermocycling device, such as an end-point polymerase chain reaction (PCR) instrument or a quantitative, or real-time, PCR instrument. Such devices are used to generate specific temperature cycles, i.e. to set predetermined temperatures in the reaction vessels to be maintained for predetermined intervals of time.

Generally, thermal cycler systems include a sample block that has a plurality of reaction regions or sample block wells and that is configured to receive a plurality of samples contained in sample wells of a sample holder. The samples may be sealed within the wells of the sample holder via a lid, cap, sealing film or any other sealing mechanism between the wells and a heated cover. A variety of sample holders are used in thermal cycler systems including, for example, a multi-well microtiter plate, a micro card, or a through-hole array. Due to the variety of available sample holders, thermal cycler systems are often designed to be compatible with more than one type of sample holder. For example, sample blocks may be configured to receive a sample holder having either a full skirt or a semi-skirt. A full-skirted sample holder has skirting that generally extends on at least two opposite sides of the sample holder to the bottom portions of the sample wells, while the skirting of the semi-skirted sample holder leaves lower portions of the sample wells exposed. Designing a thermal cycler system compatible with sample holders having different designs often leads to inefficiencies depending on the actual sample holder used. To perform the PCR process successfully, efficiently, and accurately, these inefficiencies should be minimized to the greatest extent possible.

There is an increasing need to provide improved thermal cycler systems that address one or more of the above drawbacks.

SUMMARY

In accordance with one embodiment, a thermal cycler system for use with a sample holder configured to receive a plurality of samples includes a sample block having an upstanding peripheral side wall and being configured to receive the sample holder and an adaptor having an upstanding peripheral side wall configured to be positioned about the peripheral side wall of the sample block. When the peripheral side wall of the adaptor is positioned about the peripheral side wall of the sample block and the sample holder is received in the sample block, the peripheral side wall of the adaptor extends in an upward direction toward the sample holder.

In accordance with another embodiment, an adaptor configured to be positioned about a sample block, the sample block including an upstanding peripheral side wall and being configured to receive a sample holder, includes an upstanding peripheral side wall. When the peripheral side wall of the adaptor is positioned about the peripheral side wall of the sample block and the sample holder is received in the sample block, the peripheral side wall of the adaptor extends in an upward direction toward the sample holder.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
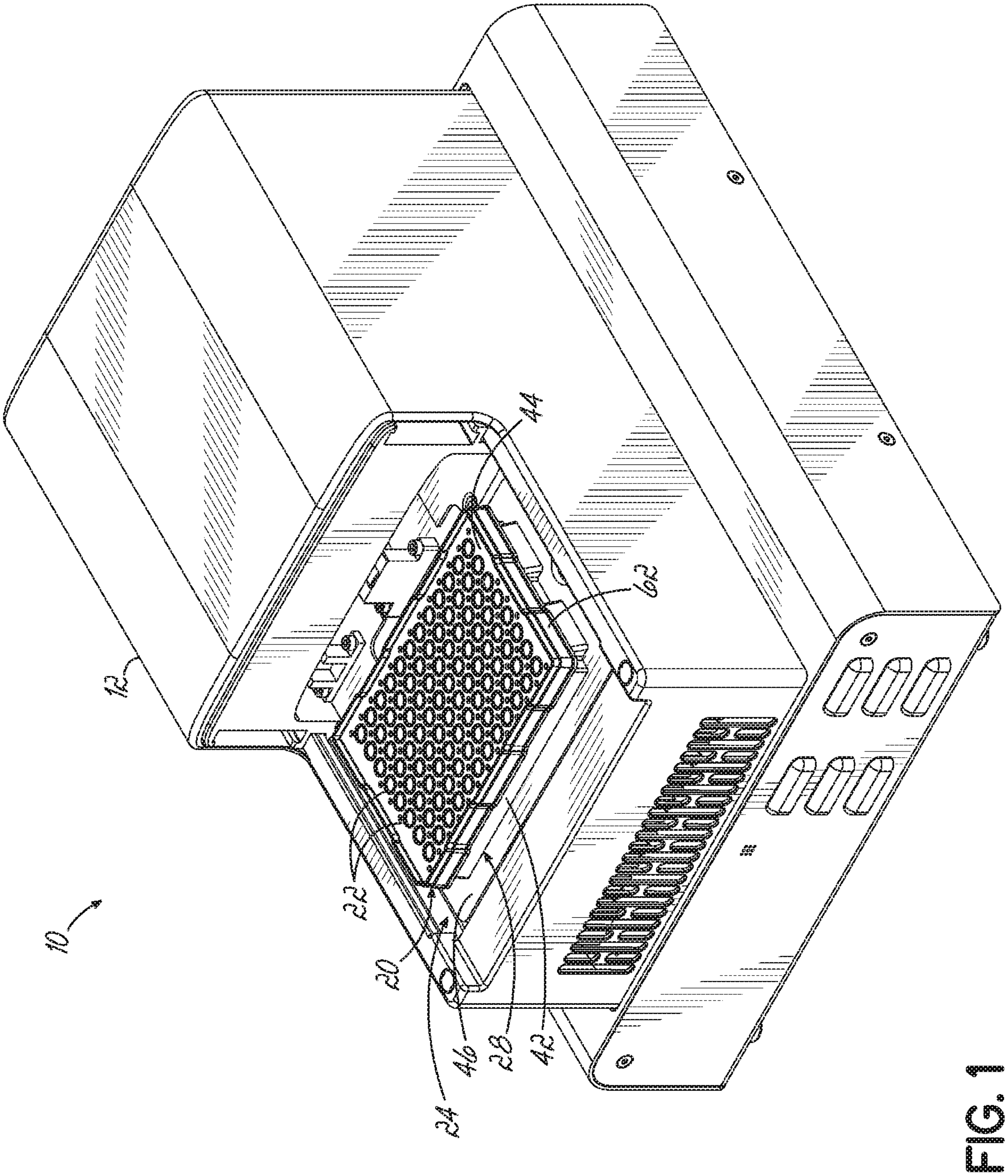
FIG. 1 is a perspective view of a thermal cycler system according to one embodiment showing an adaptor and sample holder positioned about the sample block.
Figure 2:
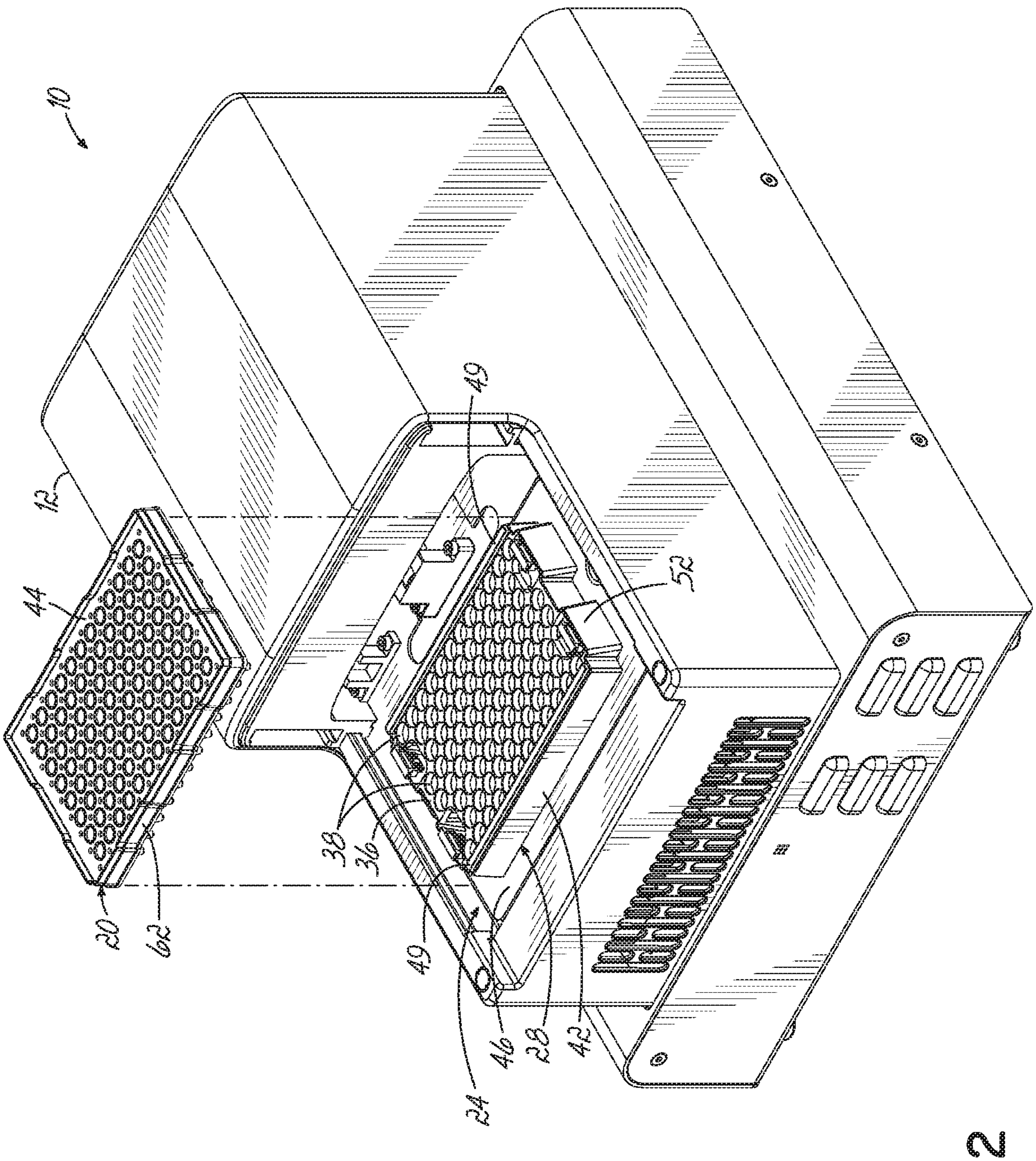
FIG. 2 is an exploded view of the thermal cycler system of FIG. 1 showing the sample holder removed from the sample block.
Figure 3:
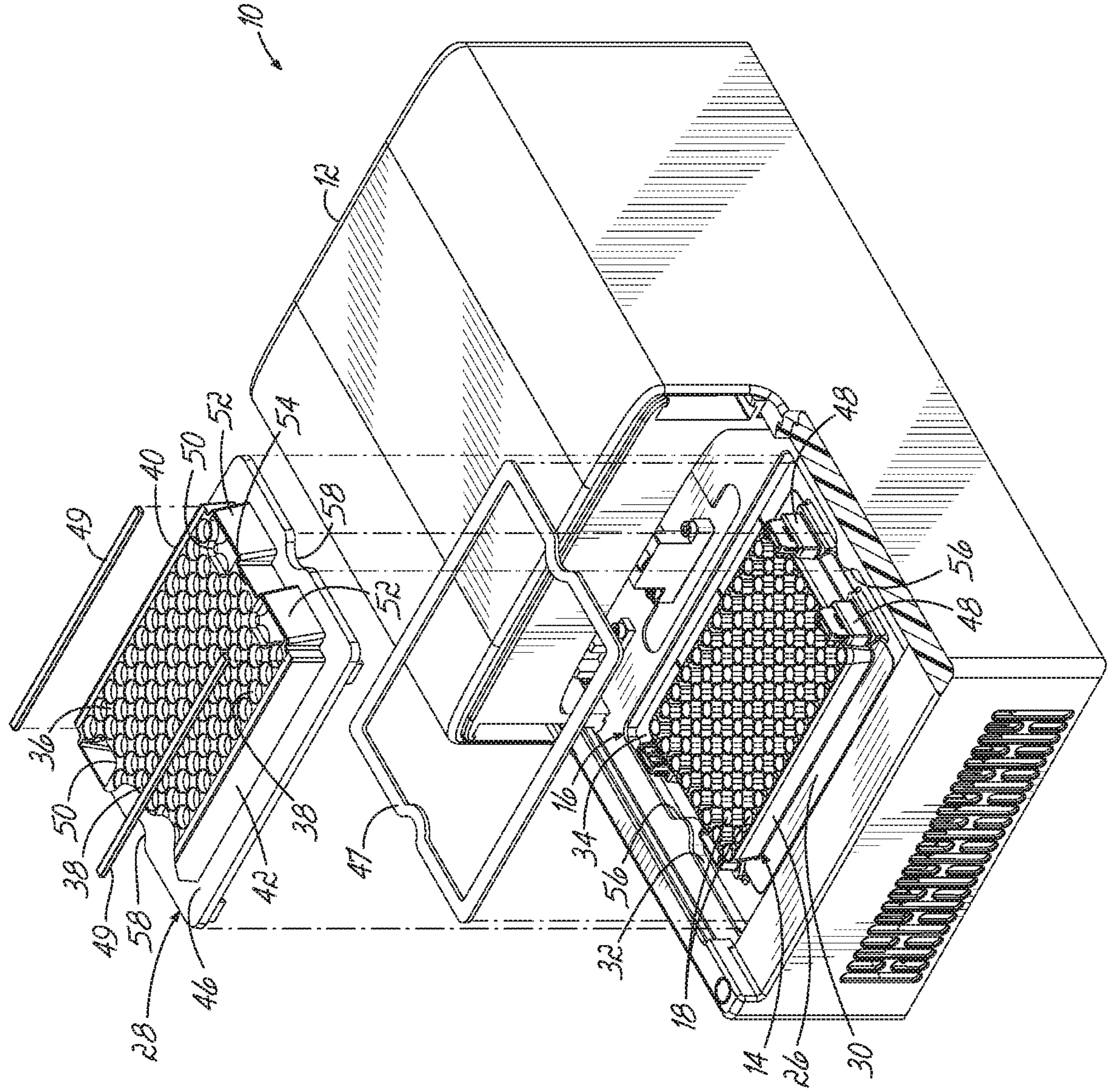
FIG. 3 is an exploded view of the thermal cycler system of FIG. 1 showing the adaptor and insulation components removed from the sample block without the sample holder and showing a portion of the housing in cross-section.

Referring to FIGS. 1-3, a thermal cycler system 10 is shown constructed in accordance with an illustrative embodiment of the present invention. The thermal cycler system 10 includes an outer housing 12, a sample block 14, and a drip pan 16. The sample block 14 includes a plurality of cavities 18 and is configured to be loaded with a correspondingly shaped sample holder 20 containing a plurality of biological or biochemical samples in a plurality of sample wells 22. The drip pan 16 is designed to seal components of the thermal cycler system 10, such as a thermal block assembly (not shown), from environmental conditions above the drip pan 16. A thermal block assembly may include, for example, a heating and cooling element and a heat exchanger or heat sink for heating and cooling the biological or biochemical samples during the PCR process. The thermal cycler system 10 is described in greater detail below.

Still referring to FIGS. 1-3, the thermal cycler system 10 includes an access area 24 for the sample holder 20 to be inserted and removed. In various embodiments, the access area 24 is configured to include enough open space for a robotic arm of a lab automation system (not shown) to position the sample holder 20 on the sample block 14. Additionally, the thermal cycler system 10 is configured to be compatible with a full-skirted sample holder (not shown). The space required for the manipulation of the sample holder 20 by a robotic arm poses a problem when the sample holder is semi-skirted rather than full-skirted. In that regard, when a semi-skirted sample holder 20 is received by the sample block 14, a peripheral wall 26 of the sample block 14 is exposed. Thus, the sample block 14 is vulnerable to an external air draft, which may severely affect the consistent thermal performance of the thermal cycler system 10. Accordingly, in one embodiment, the thermal cycler system 10 includes an adaptor 28, which is described in greater detail below.

The exemplary thermal cycler system 10, unless otherwise indicated, is described herein using a reference frame in which the sample holder 20 may be loaded in the front of the thermal cycler system 10 and may be positioned above the sample block 14. Consequently, as used herein, terms such as lateral, forward, backward, downward, upward, beneath, and above used to describe the exemplary thermal cycler system 10 are relative to the chosen reference frame. The embodiments of the present invention, however, are not limited to the chosen reference frame and descriptive terms. Those of ordinary skill in the art will recognize that the descriptive terms used herein may not directly apply when there is a change in reference frame. Nevertheless, the relative terms used to describe embodiments of the thermal cycler system 10 are to merely provide a clear description of the embodiments in the drawings. As such, the relative terms lateral, forward, backward, downward, upward, beneath, and above are in no way limiting the present invention to a particular location or orientation.

Figure 4A:
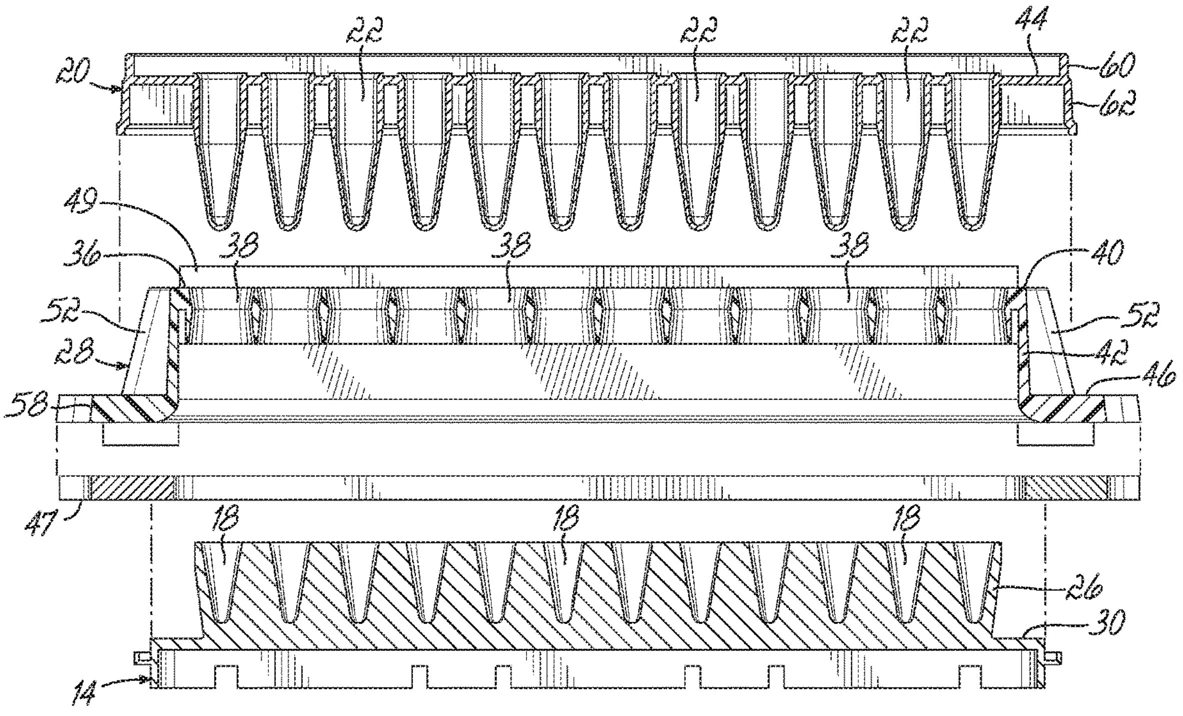
FIG. 4A is a cross-sectional view of a portion of the thermal cycler system of FIG. 1 and the sample holder.

With reference now to FIGS. 3 and 4A, the exemplary sample block 14 is shown in more detail. The sample block 14 includes a base 30 and the upstanding peripheral side wall 26, which encloses the plurality of cavities 18. As described above, the plurality of cavities 18 are configured to receive the plurality of correspondingly shaped sample wells 22 of the sample holder 20. In the illustrative embodiment, the sample block 14 includes 96 cavities 18. In such an embodiment, the sample holder 20 may be a 96-well microtiter plate. It should be recognized that the sample block 14 and the sample holder 20 may have alternate configurations. For example, the sample holder 20 may be, but is not limited to, any size multi-well plate, card or array including, but not limited to, a 24-well microtiter plate, 50-well microtiter plate, a 384-well microtiter plate, a microcard, a through-hole array, or a substantially planar holder, such as a glass or plastic slide.

Still referring to FIGS. 3 and 4A, the exemplary drip pan 16 is shown in more detail. The drip pan 16 forms a seal between the sample block 14 and the drip pan 16 to isolate thermoelectric components (not shown) from environmental conditions above the sample block 14 and the drip pan 16. In particular, the drip pan 16 prevents any sample that may splash out of the sample wells 22 from reaching the sensitive electronic components of the thermal block assembly (not shown). The drip pan 16 includes a side wall 32 and a bottom surface 34. In one embodiment, the drip pan 16 is configured to receive the adaptor 28. Further, the drip pan 16 may be configured to secure a lateral position of the adaptor 28 relative to the drip pan 16. In that regard, when the adaptor 28 is received by the drip pan 16, the side wall 32 of the drip pan 16 prevents lateral movement of the adaptor 28.

With reference again to FIGS. 3 and 4A, the adaptor 28 is shown in more detail. The adaptor 28 includes a deck portion 36 including a plurality of apertures 38. The plurality of apertures 38 is configured to allow the array of sample wells 22 of the sample holder 20 to extend therethrough when the adaptor 28 is positioned about the sample block 14 and sample holder 20 is received by the sample block 14 (shown in FIG. 4B). A perimeter 40 of the deck portion 36 is formed with an upstanding peripheral side wall 42 extending downwardly beneath the deck portion 36. The upstanding peripheral side wall 42 is configured to be positioned about the peripheral side wall 26 of the sample block 14. When the peripheral side wall 42 of the adaptor 28 is positioned about the peripheral side wall 26 of the sample block 14 and the sample holder 20 is received in the sample block 14, the peripheral side wall 42 of the adaptor 28 extends in an upward direction toward the sample holder 20 (described below). In other words, the peripheral side wall 42 of the adaptor 28 may extend in a direction from the base 30 of the sample block 14 towards a deck portion 44 of the sample holder 20. In this manner, the peripheral side wall 42 of the adaptor 28 is configured to protect the peripheral side wall 26 of the sample block 14 from undesirable contact with air flow during the PCR process. It should be recognized that the peripheral side wall 42 of the adaptor 28 may be a continuous or a discontinuous side wall. In other words, in various embodiments, the peripheral side wall 42 may comprise one or more wall segments.

Still referring to FIGS. 3 and 4A, the perimeter of the upstanding peripheral side wall 42 of the adaptor 28 includes a lip 46 extending therefrom. The lip 46 is configured to be received by the drip pan 16. When the lip 46 is received by the drip pan 16, the lateral position of the adaptor 28 may be secured by the drip pan 16. In one embodiment, an insulation component 47 may be positioned between the drip pan 16 and the lip 46 of the adaptor 28. The insulation component 47 may be adhered to the drip pan 16, for example. Additionally, in one embodiment, insulation components 49 may be coupled to the deck portion 36 of the adaptor 28. The insulation components 49 may aid in preventing draft air from the front and back of the thermal cycler system 10. In addition, the insulation components 49 may also act as a secondary uniform force on the bottom of the sample holder 20 to aid in the ejection of the sample holder 20 after the PCR process is complete. The insulation components 47, 49 may be made of BISCO.RTM. HT-800 Medium Cellular Silicone available from Rogers Corporation in Rogers, Conn. for example. While the adaptor 28 is shown as including the deck portion 36 and the lip 46, it should be recognized that other configurations of the adaptor 28 are possible. For example, an adaptor according to one embodiment may not include a deck portion or a lip. Further, in one embodiment, the adaptor 28 may be configured to accommodate a full-skirted sample holder (not shown). In an embodiment where the adaptor 28 is configured to accommodate only semi-skirted sample holders, the adaptor 28 may be positioned about the sample block 14 before the sample holder 20 is loaded. For subsequent runs, no user intervention or replacement is necessary until the user wants to use a full-skirted sample holder.

Referring again to FIGS. 2 and 3, in one embodiment, the drip pan 16 includes a plurality of ejector mechanisms 48. While the illustrated embodiment shown in FIG. 3 depicts four ejector mechanisms 48, other embodiments may employ a single ejector mechanism 48 or a suitable number of a plurality of ejector mechanisms 48. The ejector mechanisms 48 may allow for easier removal of the sample holder 20 after the PCR process is complete. Each ejector mechanism 48 may comprise one or more springs that are compressed when a sample holder 20 is placed onto the sample block. As illustrated within the embodiments shown in FIGS. 2 and 3, the springs are contained within a housing component of the ejector mechanisms 48, but other embodiments may employ different housings or no housing at all. Additionally, the number and size of ejector mechanisms 48 (and the number of size of springs within ejector mechanisms 48) will vary depending on the size and format of drip pan 16, sample block 14, sample holder 20 and any adaptor 28 that is employed. To account for the ejector mechanisms 48, the adaptor 28 includes a plurality of openings 50 configured to allow the ejector mechanisms 48 to extend therethrough in order to make contact with sample holder 20 for the purposes of ejection. The openings 50 may extend beyond the perimeter of the peripheral side wall 42. Therefore, the peripheral side wall 42 may include extensions 52. When the ejector mechanisms 48 extend through the openings 50, the extensions 52 of the peripheral side wall 42 at least partially surround the ejector mechanisms 48. Further, the perimeter 40 of the deck portion 36 may extend inward from the perimeter of the peripheral side wall 42. In the illustrated embodiment, the openings 50 extend across a section of the deck portion 36 that may otherwise include apertures 38. Accordingly, the openings 50 may be configured to allow one or more of the sample wells 22 of the sample holder 20 to extend therethrough when the sample holder 20 is positioned adjacent the adaptor 28. Further, a deck portion segment 54 of the deck portion 36 may extend to the perimeter of the peripheral side wall 42 between the openings 50. In this manner, the peripheral side wall 42 acts to protect the sample block 14 from undesirable contact with air flow while allowing the ejector mechanisms 48 to extend through the adaptor 28.

Figure 6A:
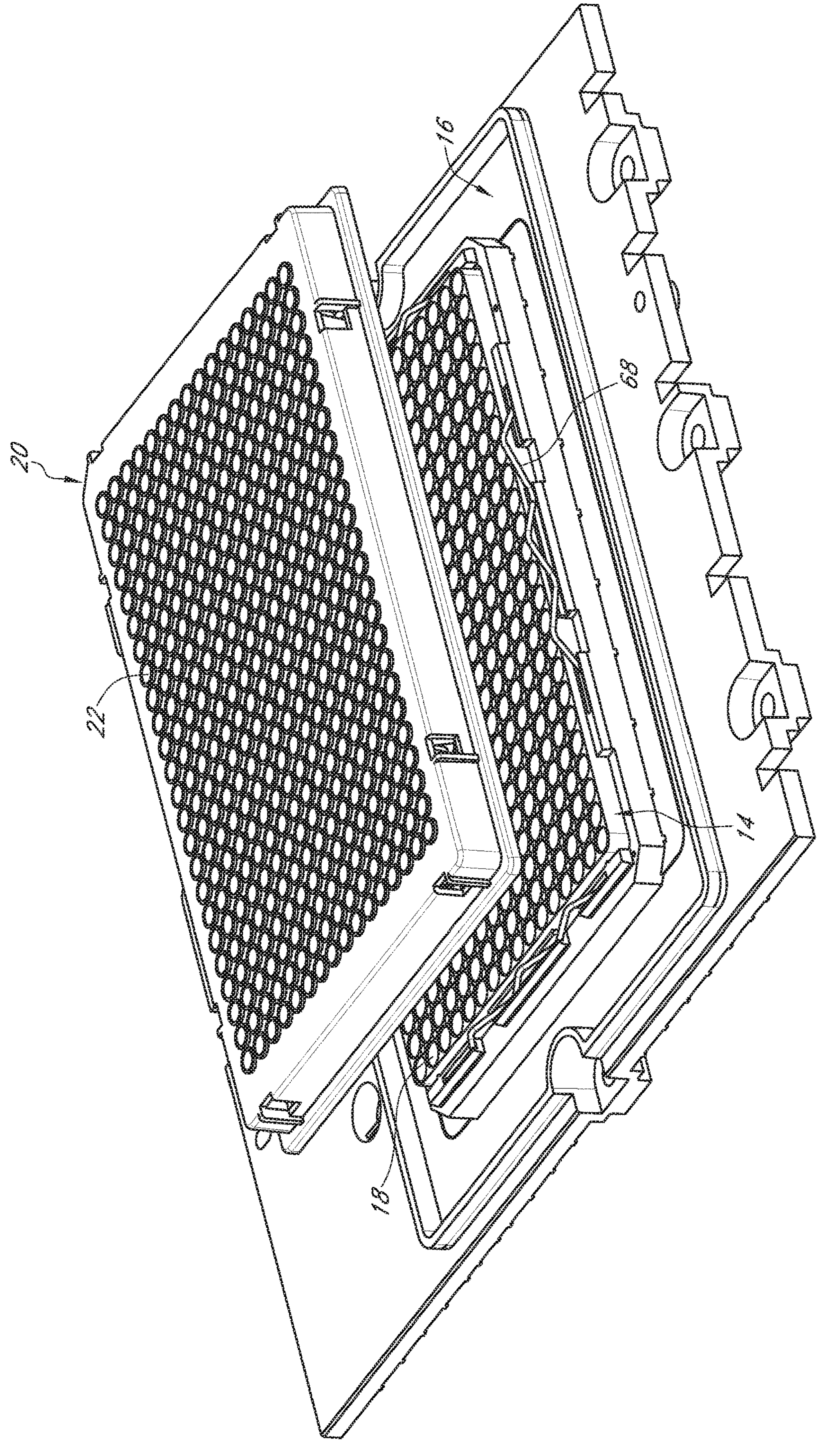
FIG. 6A is a perspective view of a sample block above a drip pan with wire form springs.
Figure 6B:
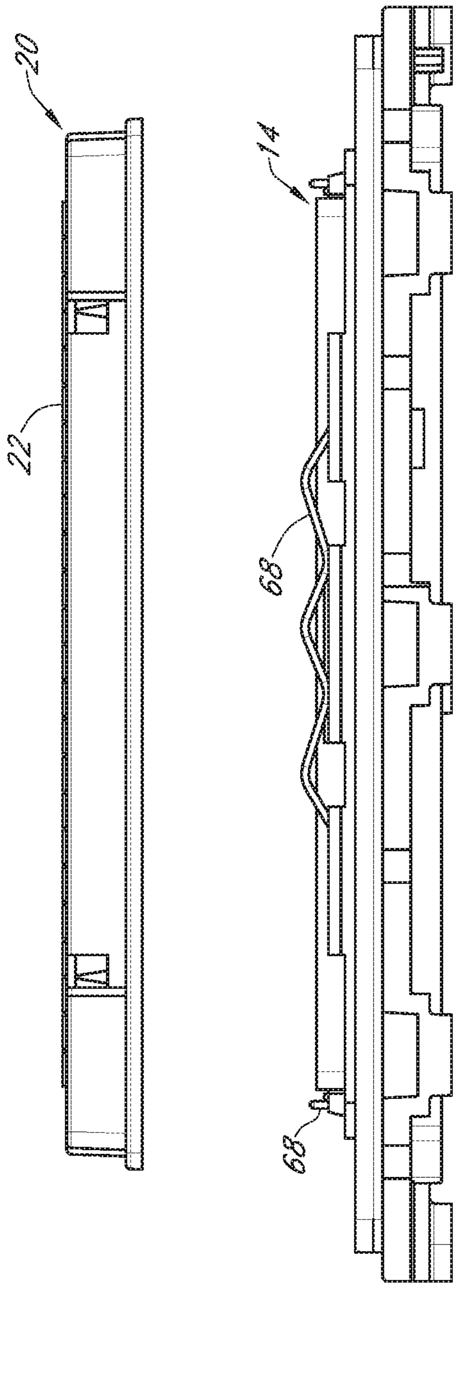
FIG. 6B is a lengthwise side view of the sample block and drip pan of FIG. 6A.
Figure 6C:
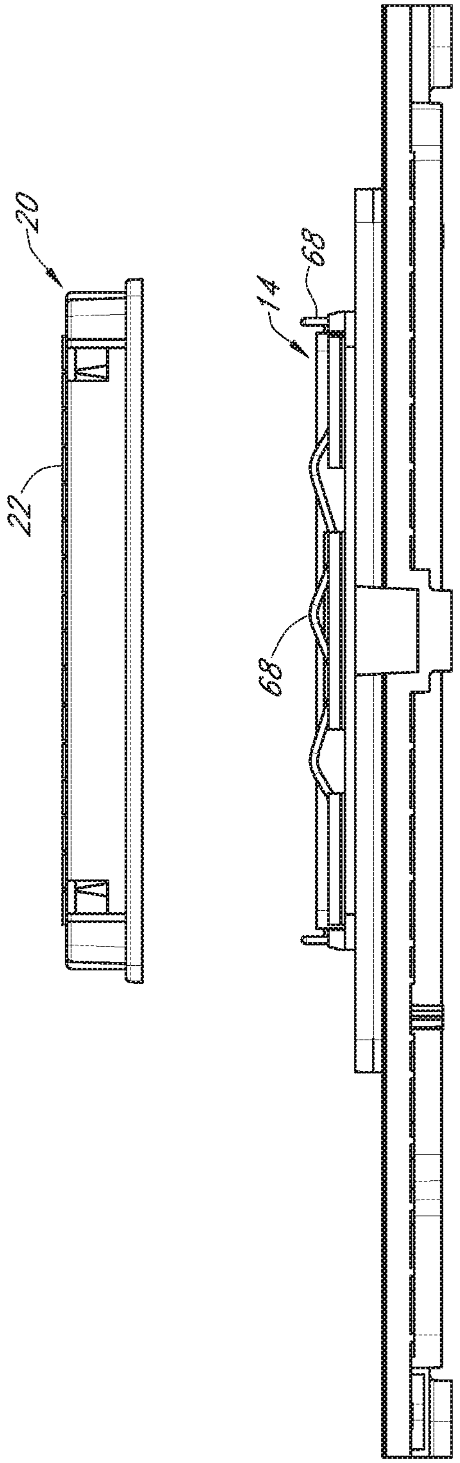
FIG. 6C is a widthwise side view of the sample block and drip pan of FIG. 6A.

With reference to FIGS. 6A-6C, an embodiment is illustrated where drip pan 16 includes wire form springs 68 as an embodiment of ejector mechanisms 48. In such embodiments, the springs are not contained within a housing, as depicted within the illustrated embodiment shown in FIGS. 2-3. Within the illustrated embodiment of FIGS. 6A-6C, drip pan 16 includes a wire form spring 68 on each of its four sides around where the sample block is placed. Other embodiments may include more than one wire form spring 68 per side, or only include one or more wire form springs 68 on a subset of the sides of drip pan 16 (e.g., on one side, two sides, or three sides). Additionally, one or more wire form springs 68 may be employed in combination with other ejector mechanisms 48, such as but not limited to those described in association with the embodiments illustrated in FIGS. 2 and 3.

With further reference to FIGS. 6A-6C, embodiments employing wire form springs 68 may be configured to operate without an adaptor 28, with sample wells 22 being inserted into cavities 18 when sample holder 20 is placed on sample block 14. The wire form springs 68 are located on drip pan 16 such that sample holder 20 is placed on top of wire form springs 68, which compresses the wire form springs 68. In this fashion, wire form springs 68 can assist in ejection of sample holder 20. The use of wire form springs 68 can be beneficial when spatial constraints may not allow the use of other ejector mechanisms 48 on one or more sides of drip pan 16, or when the spatial constraints do not allow the use of an adaptor 28 (e.g., when spatial constraints do not allow the use of an adaptor 28 with a plurality of openings 50 through which ejector mechanisms 48 extend, as illustrated within the embodiment shown in FIG. 3). Certain embodiments, including but not limited to those using an adaptor 28, may combine wire form springs 68 with other ejector mechanisms 48 to enhance the overall ejection of sample holder 20. Wire form springs 68 can comprise any suitable material. Non-limiting examples of suitable wire form springs 68 include music wire of 0.90 mm of SWP-B, JIS G3522 with zinc plating or chromium finishing, and also stainless steel wire springs of 0.90 mm of stainless steel 17-7 PH with precipitation hardening. Other suitable materials for wire form springs 68 include high carbon steel, carbon alloys, hard drawn steel, steel alloys, non-ferrous alloys, high temperature alloys, and other metals and alloys known in the art.

With further reference to FIGS. 2 and 3, embodiments employing a sample holder 20 in a full skirt configuration may utilize the heated cover and adaptor 28 to enhance removal of sample holder 20. In such embodiments, when the heated cover is lowered to provide a downward force to the sample holder 20 as discussed below in reference to FIGS. 2 and 4A, the skirt of sample holder 20 will sit on top of and be depressed into a portion of adaptor 28. The materials for the skirt of sample holder 20 and the adaptor 28 are chosen in such embodiments to allow the skirt to be depressed into the adaptor without damaging either component. For example, a skirt wall 62 of plastic and the corresponding portion of adaptor 28 of silicon rubber allowing for repeated use with the plastic skirt wall 62 being depressed into the silicon rubber portion of adaptor 28. Any appropriate portion of the skirt of sample holder 20 can be depressed into adaptor 28, such as a side or sides of sample holder 20 that do not interact with other features (for example, ejector mechanisms 48) to enhance removal of sample holder 20. Removal of the heated cover removes the downward force onto sample holder 20, thereby creating a spring cantilever force to eject sample holder 20. In one embodiment, sample holder 20 in a full skirt configuration employs the depression of the skirt into adaptor 28 for the ejection and removal of sample holder 20. In another embodiment, the full skirt configuration of sample holder 20 being depressed into adaptor 28 is combined with the use of ejector mechanisms (for example, the plurality of ejector mechanisms as described in the illustrated embodiment within FIG. 3). In embodiments where drip pan 16 includes one or more ejector mechanisms 48 and a full skirt configuration of sample holder 20 is utilized, the skirt may be depressed into adaptor 28 along sides or portions for which there are no ejector mechanisms 48, thereby providing ejection force (from, for example, both or either ejector mechanisms 48 or from the spring cantilever force created when the heated cover is lowered onto the sample holder) that will act on multiple sides of sample holder 20. In reference to the illustrated embodiment of FIG. 3, use of a sample holder 20 with a full skirt would allow the use of ejector mechanisms 48 along the short sides of sample holder 20 to be combined with depression of the long sides of the skirt into adaptor 28 in order to provide ejection force on all four sides of sample holder 20. Embodiments utilizing the creation of a spring cantilever force to aid in removal of sample holder 20 after lifting of the heated cover provide advantages in ensuring complete removal. The temperatures involved during thermal cycling can complicate complete removal as the heat can cause thermal warpage of sample holder 20, such as when higher temperatures during thermocycling are employed or when sample holder 20 comprises non-hard shell materials that are more susceptible to thermal warpage.

With further reference to FIG. 3, in one embodiment, the drip pan 16 and the adaptor 28 include corresponding mating features. The corresponding mating features act as a self-locating feature to ensure the proper placement of the adaptor 28. In the illustrated embodiment, the side wall 32 of the drip pan 16 includes projections 56, and the lip 46 of the adaptor 28 includes recesses 58. The projections 56 are configured to engage the recesses 58 when the adaptor 28 is received by the drip pan 16. In that manner, the adaptor 28 is unlikely to be displaced if it is accidently hit by a robotic arm (not shown) during operation.

With reference now to FIGS. 2 and 4A, the exemplary sample holder 20 is shown in more detail. The sample holder 20 includes a deck portion 44 that supports the plurality of sample wells 22 in a regular array or matrix. The deck portion 44 serves to connect the adjacent sample wells 22 near to or at the top of each sample well 22 and to hold them in the desired matrix. The sample wells 22 are designed with generally thin walls to allow heat transfer to take place between the sample block 14 and the contents of the well. A perimeter 60 of the deck portion 44 is commonly formed with a skirt wall 62 extending downwardly beneath the deck portion 44. The skirt wall 62 may be integrally formed with the deck portion 44 during molding of the sample holder 20 and generally forms a continuous wall of constant height around the sample holder 20. In the illustrated embodiment, the sample holder 20 is semi-skirted meaning the skirt wall 62 does not extend to the bottom of the sample wells 22. The skirt wall 62 lends stability to the sample holder 20 when it is placed on a surface and some rigidity when the sample holder 20 is being handled. The sample holder 20 is configured to be positioned over the sample block 14 and the adaptor 28. A heated cover (not shown) may provide a downward force to the sample holder 20. The downward force provides vertical compression between the sample holder 20, the sample block 14, and the other components of thermal block assembly (not shown), which improves thermal contact between the sample block 14 and the sample holder 20 to heat and cool the samples in the sample wells 22. The heated cover may also prevent or minimize condensation and evaporation above the samples contained in the sample wells 22, which can help to maintain optical access to samples.

Referring again to FIGS. 3 and 4A, the sample wells 22 of the sample holder 20 are configured to receive a plurality of samples. The sample wells 22 may be sealed within the sample holder 20 via a lid, cap, sealing film or other sealing mechanism between the sample wells 22 and the heated cover (not shown). The sample wells 22 in various embodiments of a sample holder 20 may include depressions, indentations, ridges, and combinations thereof, patterned in regular or irregular arrays formed on the surface of the sample holder 20. Sample or reaction volumes can also be located within wells or indentations formed in a substrate, spots of solution distributed on the surface a substrate, or other types of reaction chambers or formats, such as samples or solutions located within test sites or volumes of a microfluidic system, or within or on small beads or spheres. Samples held within the sample wells 22 may include one or more of at least one target nucleic acid sequence, at least one primer, at least one buffer, at least one nucleotide, at least one enzyme, at least one detergent, at least one blocking agent, or at least one dye, marker, and/or probe suitable for detecting a target or reference nucleic acid sequence.

Figure 4B:
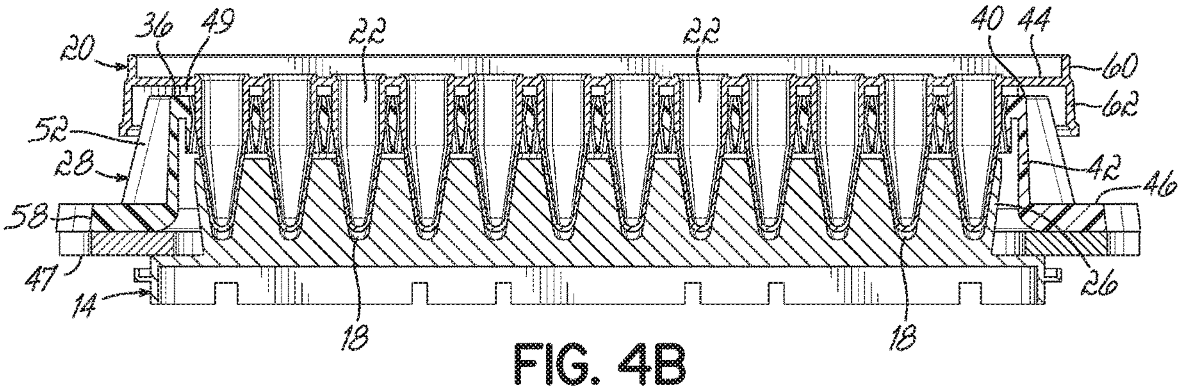
FIG. 4B is a cross-sectional view of the portion of the thermal cycler system of FIG. 4A showing the sample holder positioned on the adaptor and the sample block.

With reference to FIGS. 4A and 4B, the configuration of the sample block 14, the adaptor 28, and the sample holder 20 is shown in more detail. A user may position the adaptor 28 so that the peripheral side wall 42 of the adaptor 28 is positioned about the peripheral side wall 26 of the sample block 14. Some of the cavities 18 of the sample block 14 are aligned with the apertures 38 of the adaptor 28, while other cavities 18 are aligned with the openings 50 (not shown in the cross-section of FIG. 4B). Next, the user may position the sample holder 20 on the sample block 14. The sample wells 22 of the sample holder 20 extend through the apertures 38 or openings 50 of the adaptor 28 and into the cavities 18 of the sample block 14. The deck portion 36 of the adaptor 28 may be configured to maintain proper engagement between the sample wells 22 of the sample holder 20 and the cavities 18 of the sample block 14. For example, the thickness of the deck portion 36 of the adaptor 28 may be designed so as to allow the sample wells 22 to properly extend into the cavities 18. If the thickness of the deck portion 36 is too large and the sample wells 22 are not properly engaged with the cavities 18, the heat transfer between the sample wells 22 and the cavities 18 may be significantly impacted leading to process inefficiencies. When the sample holder 20 is received by the sample block 14, the peripheral side wall 42 of the adaptor 28 extends in an upward direction toward the sample holder 20. In other words, the peripheral side wall 42 of the adaptor 28 extends in a direction from the base 30 of the sample block 14 towards the deck portion 44 of the sample holder 20. Further, the peripheral side wall 42 extends laterally in a space between the skirt wall 62 of the sample holder 20 and the peripheral side wall 26 of the sample block 14. In this manner, the peripheral side wall 42 of the adaptor 28 protects the peripheral side wall 26 of the sample block 14 from undesirable air flow that would interfere with the heat transfer during the PCR process.

Figure 5:
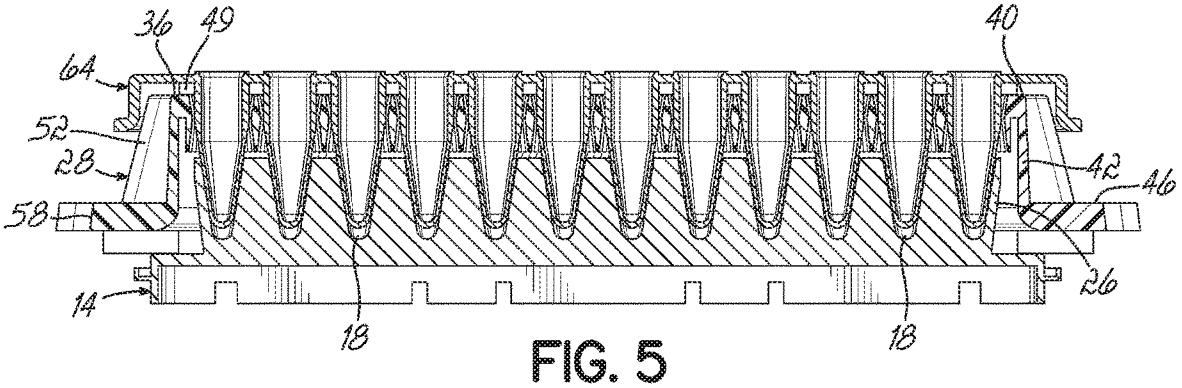
FIG. 5 is a cross-sectional view of a portion of the thermal cycler system of FIG. 1 and a sample holder having a different design than the sample holder of FIG. 4A.

Advantageously, the configuration of the adaptor 28 allows for the thermal cycler system 10 to be compatible with sample holders that vary in design. The design of the peripheral side wall of commercially available sample holders may vary, for example. With reference to FIG. 5, a sample holder 64 is shown positioned on the adaptor 28. As can be seen, the sample holder 64 has a design that differs from the design of the sample holder 20 shown in FIGS. 4A and 4B. Thus, the adaptor 28 is configured to receive a variety of sample holders.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A thermal cycler system comprising:

a sample block comprising:

a base, a first peripheral sidewall extending upwardly from the base, and a plurality of cavities surrounded by the first peripheral sidewall, the plurality of cavities configured to respectively removably receive a plurality of wells of a sample holder;

one or more ejector mechanisms positioned adjacent the first peripheral sidewall of the sample block, the one or more ejector mechanisms configured to cause force to be exerted on a sample holder in a direction away from the sample block in a state of the sample holder received by the sample block; and an adaptor configured to removably receive the sample block, the adaptor comprising:

a deck portion defining a plurality of apertures, a second peripheral sidewall extending downwardly from the deck portion, and one or more openings configured to receive the one or more ejector mechanisms in a position of the adaptor receiving the sample block, wherein in a state of the sample block received by the adaptor:

the second peripheral sidewall of the adaptor extends at least partially around the first peripheral sidewall of the sample block, and the plurality of apertures are positioned over the plurality of cavities, respectively.

2. The thermal cycler system of claim 1, wherein in a state of the sample block received by the adaptor, the second peripheral sidewall of the adaptor extends from the deck portion to proximate the base of the sample block.

3. The thermal cycler system of claim 1, wherein the one or more ejector mechanisms comprise a spring.

4. The thermal cycler system of claim 1, wherein the one or more openings are defined in the second peripheral sidewall.

5. The thermal cycler system of claim 1, wherein the one or more ejector mechanisms comprise two ejector mechanisms positioned adjacent the first peripheral sidewall along a first side of the sample block and two ejector mechanisms positioned adjacent the first peripheral sidewall along a second side of the sample block opposite the first side.

6. The thermal cycler system of claim 1, wherein the one or more ejector mechanisms are moveable between a retracted configuration and an extended configuration, and a portion of each of the one or more ejector mechanisms extends above the sample block in the extended configuration.

7. The thermal cycler system of claim 6, wherein the one or more ejector mechanisms are biased toward the extended configuration.

8. The thermal cycler system of claim 1, further comprising a drip pan surrounding the sample block.

9. The thermal cycler system of claim 8, wherein the drip pan comprises the one or more ejector mechanisms.

10. The thermal cycler system of claim 8, wherein the second peripheral sidewall of the adaptor is configured to be received in a gap defined between the drip pan and the sample block in a position of the sample block received by the adaptor.

11. The thermal cycler system of claim 1, further comprising an insulation component configured to surround a perimeter defined by the first peripheral sidewall of the sample block.

12. The thermal cycler system of claim 1, further comprising the sample holder comprising the plurality of wells.

13. The thermal cycler system of claim 12, wherein the sample holder comprises a peripheral skirt surrounding the plurality of wells.

14. The thermal cycler system of claim 13, wherein the plurality of wells have a depth extending beyond the peripheral skirt.

15. The thermal cycler system of claim 13, wherein, in a position of the sample block received by the adaptor and the sample holder received by the sample block, the peripheral skirt of the sample holder at least partially surrounds an upper portion of the second peripheral sidewall of the adaptor.

16. The thermal cycler system of claim 13, wherein, in a position of the sample block received by the adaptor and the sample holder received by the sample block, the peripheral skirt terminates at a height above the first peripheral sidewall.

* * * * *